US009565860B2

(12) United States Patent
van Aswegen et al.

(10) Patent No.: US 9,565,860 B2
(45) Date of Patent: Feb. 14, 2017

(54) APPARATUS AND METHOD FOR BAKING ROLLS

(71) Applicant: Sport On the Roll CC, Cape Town (ZA)

(72) Inventors: Andrew Stuart van Aswegen, Cape Town (ZA); Harold Nakan, Cape Town (ZA)

(73) Assignee: Sport On The Roll CC, Cape Town (ZA)

( * ) Notice: Subject to any disclaimer, the term of this patent is extended or adjusted under 35 U.S.C. 154(b) by 0 days.

(21) Appl. No.: 14/438,738

(22) PCT Filed: Oct. 25, 2013

(86) PCT No.: PCT/IB2013/059645
§ 371 (c)(1),
(2) Date: Apr. 27, 2015

(87) PCT Pub. No.: WO2014/064649
PCT Pub. Date: May 1, 2014

(65) Prior Publication Data
US 2015/0289521 A1    Oct. 15, 2015

(30) Foreign Application Priority Data

Oct. 25, 2012   (ZA) ................... 2012/08062

(51) Int. Cl.
*A21B 3/13*     (2006.01)
*A21B 5/00*     (2006.01)
*A21D 13/00*    (2006.01)

(52) U.S. Cl.
CPC ............... *A21B 3/133* (2013.01); *A21B 3/132* (2013.01); *A21B 3/138* (2013.01); *A21B 3/139* (2013.01); *A21B 5/00* (2013.01); *A21D 13/0087* (2013.01)

(58) Field of Classification Search
CPC .......... A21B 3/132; A21B 3/133; A21B 3/138
See application file for complete search history.

(56) References Cited

U.S. PATENT DOCUMENTS

| 1,831,147 A | 11/1931 | Smith |
| 2,221,052 A * | 11/1940 | Kratzer .................. A21B 3/132 |
| | | 249/121 |
| 2,708,889 A * | 5/1955 | Nafziger ................ A21B 3/133 |
| | | 220/23.2 |

(Continued)

FOREIGN PATENT DOCUMENTS

| WO | 2006071993 A2 | 7/2006 |
| WO | 2011035383 A1 | 3/2011 |
| WO | 2013116884 A1 | 8/2013 |

*Primary Examiner* — James Sanders
(74) *Attorney, Agent, or Firm* — The Webb Law Firm

(57) ABSTRACT

Disclosed is an apparatus for baking products and particularly for baking rolls having an ornamental surface finish. The apparatus includes a baking tray which has a first mould and a second mould, and, preferably, an insert which is receivable in an opening formed in the second mould. The moulds are securable to one another to prevent them from separating during the baking process. The insert is held captive by the first mould or the first and second moulds combined in a position in which an internal cavity defined by an internal surface of the insert is aligned with a dough receiving cavity in the first mould when they are secured together. Also disclosed is a method of baking rolls.

17 Claims, 12 Drawing Sheets

(56) References Cited

U.S. PATENT DOCUMENTS

| | | |
|---|---|---|
| 3,379,120 A | 4/1968 | Fogle |
| 4,216,241 A | 8/1980 | Thompson |
| 7,998,516 B2 * | 8/2011 | Brandt .................. A21B 3/132 426/279 |
| 2007/0178198 A1 | 8/2007 | Lichtenstein |

* cited by examiner

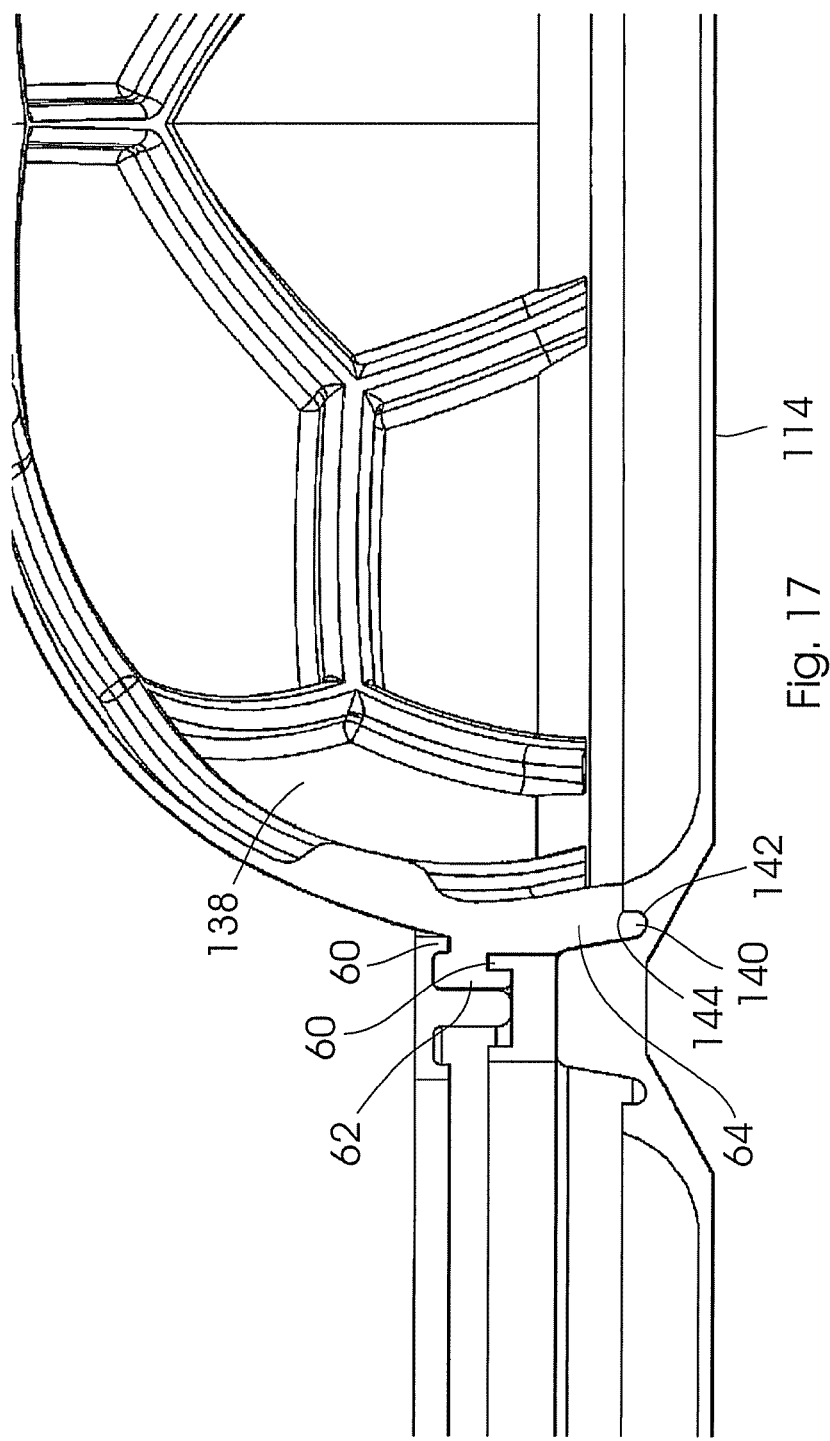

APPARATUS AND METHOD FOR BAKING ROLLS

CROSS-REFERENCE TO RELATED APPLICATIONS

This application is the United States national phase of International Application No. PCT/IB2013/059645 filed Oct. 25, 2013, and claims priority to South African Patent Application No. 2012/08062 filed Oct. 25, 2012, the disclosures of which are hereby incorporated in their entirety by reference.

BACKGROUND OF THE INVENTION

Field of the Invention

This invention relates to an apparatus and method for baking rolls. In particular, but not exclusively, the invention relates to an apparatus and method for baking rolls having a decorative surface finish.

Description of Related Art

A number of different baking methods for baking bread rolls on a commercial scale are currently being used to produce large volumes of rolls. These methods typically involve the use of conveyer belt ovens or shelf style ovens where trays containing the dough are stacked and rolled into the ovens on the conveyer belt or on trolleys. The trays on which the dough is placed are generally open at their tops to allow the dough to rise during baking.

One known method of adding surface detail to the outside, top surfaces of the rolls involves stamping the dough prior to baking them. The level of surface detail that can be obtained by using this method is very restricted and mostly limited to rough surface patterns. A person familiar with this method will know that the surface pattern on the rolls is formed as a result of the lack of browning on the lines created by stamping the dough. One example where this method has been used is to create a soccer-ball-like surface pattern on rolls. The limitation on surface detail obtainable using this method makes it unsuitable for use in creating finer surface detail such as logos, for example.

As a possible solution to this problem it has been suggested to have a two piece baking tray consisting of a bottom mould in which the dough is placed and a top mould into which the rolls are baked. One of the problems of using these baking trays, and in particular in a commercial baking process, is the trays have to be damage resistant as well as be easy to handle. If a mould gets damaged it is no longer capable of being used in a commercial baking process. For example, a dent in a mould typically results in a misshaped roll, which is unacceptable in a commercial baking process.

Problems with proper ventilation through the baking moulds are also often experienced when using top and bottom moulds as described above. The locations of venting holes, which release air that gets trapped when the dough expands, in the top and bottom moulds are also critical as no holes or incorrect placement of the holes could again result in misshaped rolls.

Whenever using top and bottom baking moulds it is important to ensure that they are held together securely in order to prevent the top mould from lifting off the bottom mould when the dough expands in the baking process. The top and bottom moulds also need to be rigid to prevent the moulds from flexing as any flexing could allow the moulds to open up which could, in turn, cause the rolls to be misshaped. The problem with securing the moulds together is that they need to be opened immediately once the rolls have been baked in order to prevent them from sweating in the moulds. The sweating is particularly evident with softer dough. If the moulds remain closed for too long after they have been removed from the oven the rolls start sweating inside the moulds due to the steam not escaping rapidly enough. This causes an undesirable, irregular surface finish on the rolls.

It is an object of this invention to alleviate at least some of the problems currently being experienced with existing baking apparatus and methods.

It is further objects of this invention to provide a baking apparatus and method that will be a useful alternative to existing controller platforms.

It is also an object of the invention to provide a new baking apparatus which is adaptable for use in different baking systems, such as conveyer belt ovens and rack systems.

SUMMARY OF THE INVENTION

According to a first aspect of the invention there is provided an apparatus for baking products, such as rolls, the apparatus including a baking tray which has a first mould and a second mould which are securable to one another to prevent them from separating during the baking process, wherein the second mould has a cavity which aligns with a dough receiving cavity in the first mould when they are secured together, and wherein an internal surface of the cavity in the second moulds has breathing holes and carries an ornamental design to create a decorative surface finish on the baked product between the two moulds during the baking process.

Preferably, the cavity in the second mould is defined by an insert being receivable in an opening formed in the second mould, wherein the insert is held captive by the first mould or the first and second moulds combined when the moulds are secured together.

The insert may be removable so that it interchangeable with an insert carrying an alternative decorative design.

The insert may be manufactured from a flexible material. In one embodiment the insert is a silicone insert.

The sidewall of the insert may be of variable thickness so as to create at least one area of higher thermal resistance and at least one area of lower thermal resistance.

The insert may include a locating formation for locating it in a corresponding locating formation on the first mould, thereby locating the insert relative to the first mould when the locating formations are engaged. The locating formation on the insert may be in the form of an annular skirt while the locating formation on the first mould may be in the form of an annular recess capable of receiving the skirt.

The skirt may carry a circumferential ridge protruding from the end thereof which is, in use, its bottom end while the first mould carries a complementary shaped annular groove located about the dough receiving cavity in which the ridge is received when the skirt is located in the annular recess to prevent the skirt from moving inwards towards the roll during the baking process.

Preferably, the second mould has a number of insert receiving openings and the first mould has a corresponding number of dough receiving cavities such that a single baking tray can be used to bake a number of individual products.

The first and second moulds are preferably securable to one another by means of a securing mechanism which is manually or automatically operable between a first, securing configuration wherein the moulds are secured together and a second, releasing configuration wherein the moulds are released from one another.

In one embodiment the securing mechanism includes a number of complementary shaped connecting formations located on the first and second moulds respectively, the connecting formations being engaged with one another when the securing mechanism is in its securing configuration and disengaged from one another when the securing mechanism it in its releasing configuration.

The connecting formations on the first mould may be in the form of wedges located on a number of sliding rods while the connecting formations on the second mould may be in the form of locking pins carrying enlarged heads which hold the wedges captive when the securing mechanism is in its secured configuration.

The securing mechanism may further be operable by means of a pivotal latch which is pivotal between and open position and a closed position corresponding with the releasing and securing configurations of the securing mechanism.

The first and second moulds may also have complementary shaped locating formations which engage one another to align the insert receiving openings in the second mould with the dough receiving cavities in the first mould when the moulds are secured together. The locating formation on first mould may be in the form of a groove while the locating formation on the second mould may be in the form of a complementary shaped ridge. The locating formation on the second mould may also be in the form of a stiffening rib to add strength and rigidity to the moulds. The locating formations can furthermore also be in the form of pins or guides.

The apparatus may further include urging means located between the first and second moulds for urging the moulds apart from one another. In one embodiment the urging means is in the form of a leaf spring. Preferably, there are four leaf springs mounted on the first mould for balancing the urging action and to prise the moulds apart evenly.

According to a second aspect of the invention there is provided an apparatus for baking products, such as rolls, the apparatus including a baking tray which has a first mould and a second mould, and an insert being receivable in an opening formed in the second mould, wherein the moulds are securable to one another to prevent them from separating during the baking process, and wherein the insert is held captive by the first mould or the first and second moulds combined, in a position in which an internal cavity defined by an internal surface of the insert is aligned with a dough receiving cavity in the first mould when they are secured together.

According to a third aspect of the invention there is provided a method of baking products having a decorative surface finish on their outside surfaces, the method including the following steps:

placing dough in a dough receiving cavity in a first mould of a baking tray;

placing an insert in a second mould of the baking tray, provided the tray does not already have a cavity with design;

locating the second mould on the first mould such that the dough receiving cavity on the first mould is aligned with an internal cavity of the insert;

securing the second mould to the first mould by means of a securing mechanism to prevent them from separating;

inserting the baking tray into an oven; and baking the dough at a desired temperature for a desired amount of time.

The method preferably includes the step of separating the moulds from one another by releasing the securing mechanism when the baking tray has been removed from the oven following the step of baking the dough.

The method may further include the step of urging the first and second trays apart using urging means such that the moulds are automatically separated upon release of the securing mechanism. The upper mould may also vary in thickness so as to create thermal barriers in certain areas to achieve a controlled browning pattern.

BRIEF DESCRIPTION OF THE DRAWINGS

The invention will now be described in more detail, by way of example only, with reference to the accompanying drawings in which:

FIG. 17 shows a detailed cross-sectional side view of the apparatus of FIG. 1.

DESCRIPTION OF THE ILLUSTRATED EMBODIMENT

Figure 1:
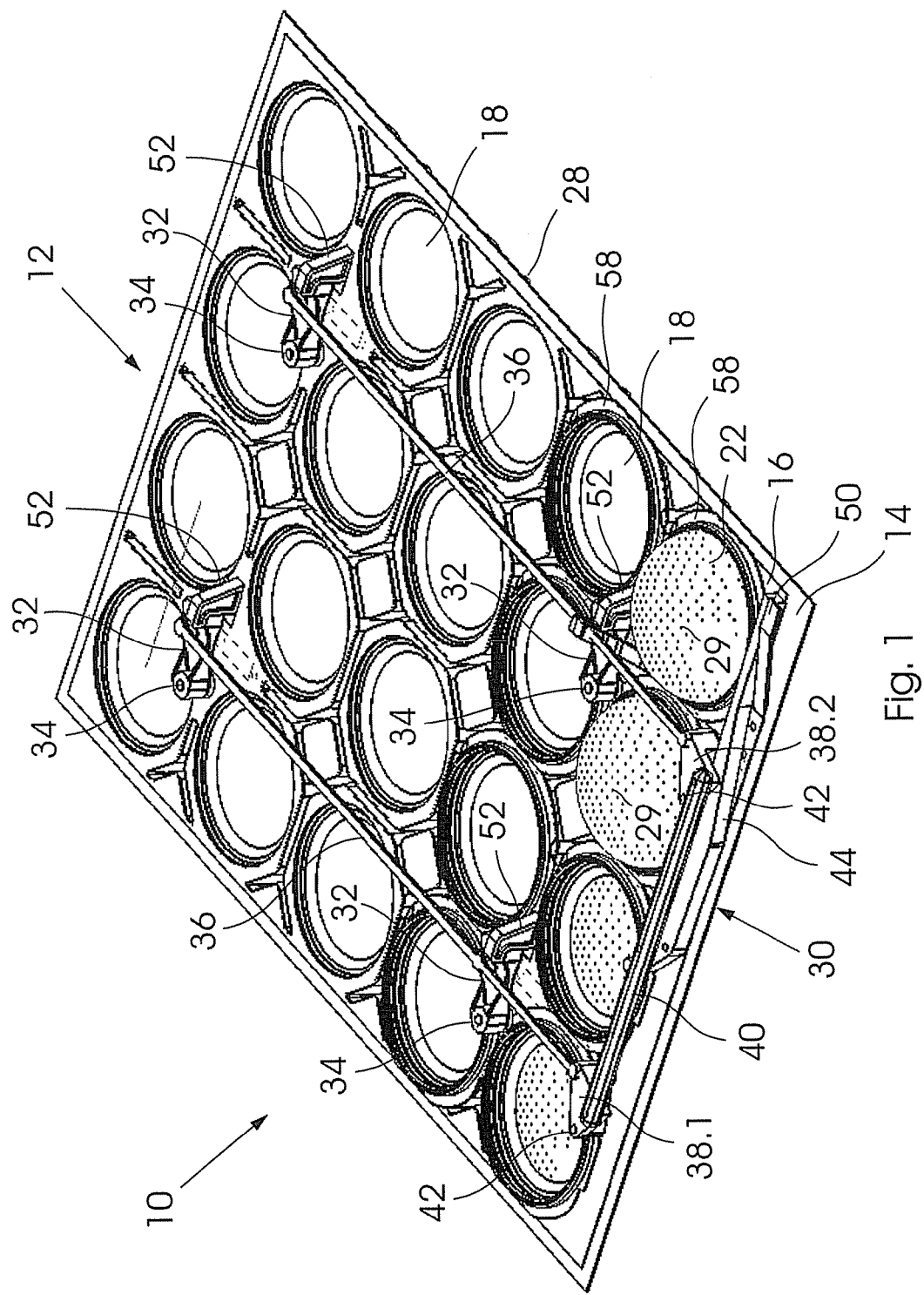
FIG. 1 shows a perspective view of an apparatus for baking rolls according to the invention in which one flexible or rigid insert into which one of the rolls bakes is visible.

Referring to the drawings, in which like numerals indicate like features, a non-limiting example of an apparatus for baking products such as bread rolls, for example, in accordance with the invention is generally indicated by reference numeral 10.

FIG. 1 shows a top perspective view of the apparatus 10. From this figure it can be seen that the apparatus 10 includes a baking tray 12 which has a first mould 14 which is, in use, a bottom mould and a second mould 16 which is, in use, a top mould. It must be understood that the terms top and bottom refer to the positions in which the moulds would typically be used during the baking process.

The bottom mould 14 is of solid construction and has at least one dough receiving cavity 18 for receiving dough prior to inserting the baking tray into an oven for baking. In the illustrated embodiment the bottom mould 14 includes a number of dough receiving cavities 18 for baking multiple rolls simultaneously. In the illustrated embodiment of FIG. 1, the bottom mould 14 has 20 dough receiving cavities 18.

The top mould 16 has at least one opening 20 in which a removable or fixed insert 22 is, in use, received. The insert 22 defines an internal cavity 24 (FIG. 6) into which a roll rises during the baking process. The insert 22 is described in greater detail below. From FIG. 1 it can be seen that the number of insert receiving openings 20 in the top mould 16 corresponds with the number of dough receiving openings in the bottom mould 14.

Figure 3:
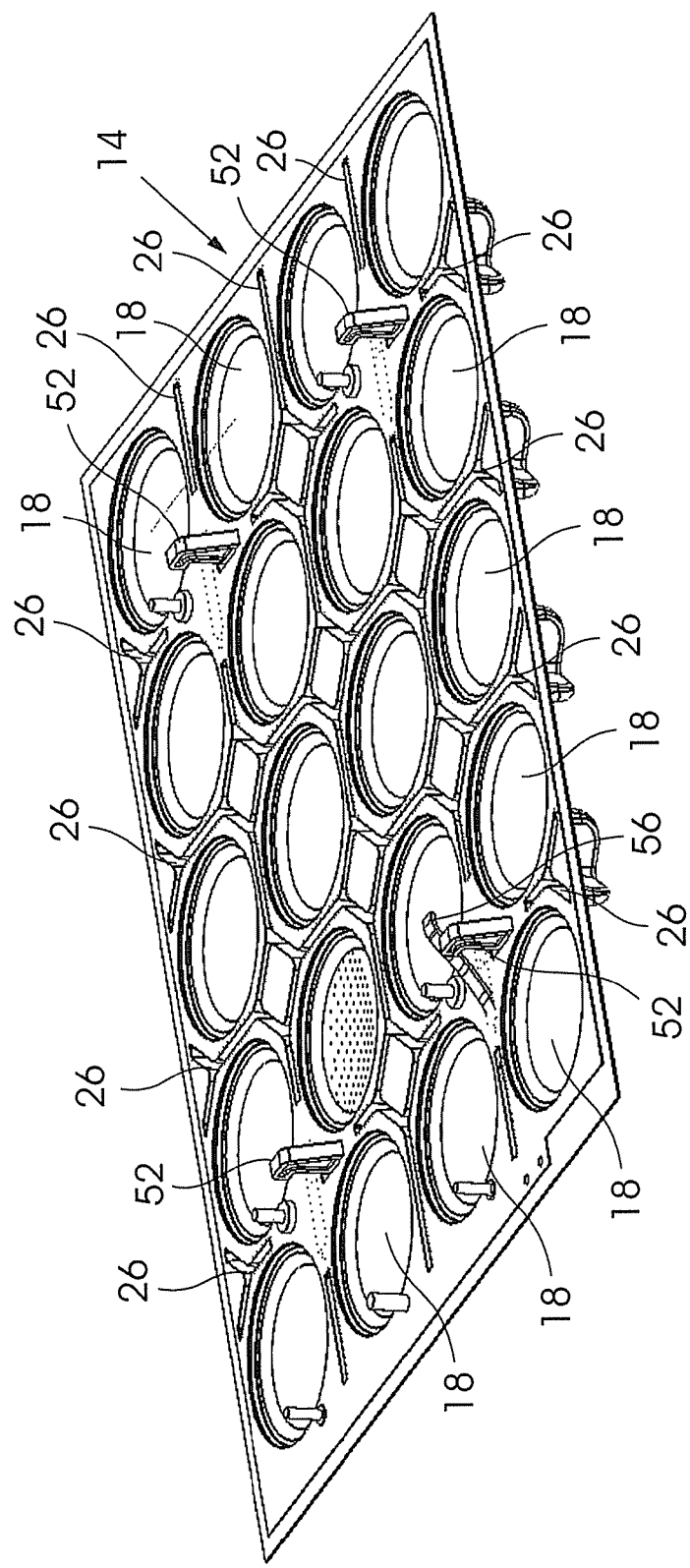
FIG. 3 shows a top perspective view of a first mould of the apparatus of FIG. 1.
Figure 4:
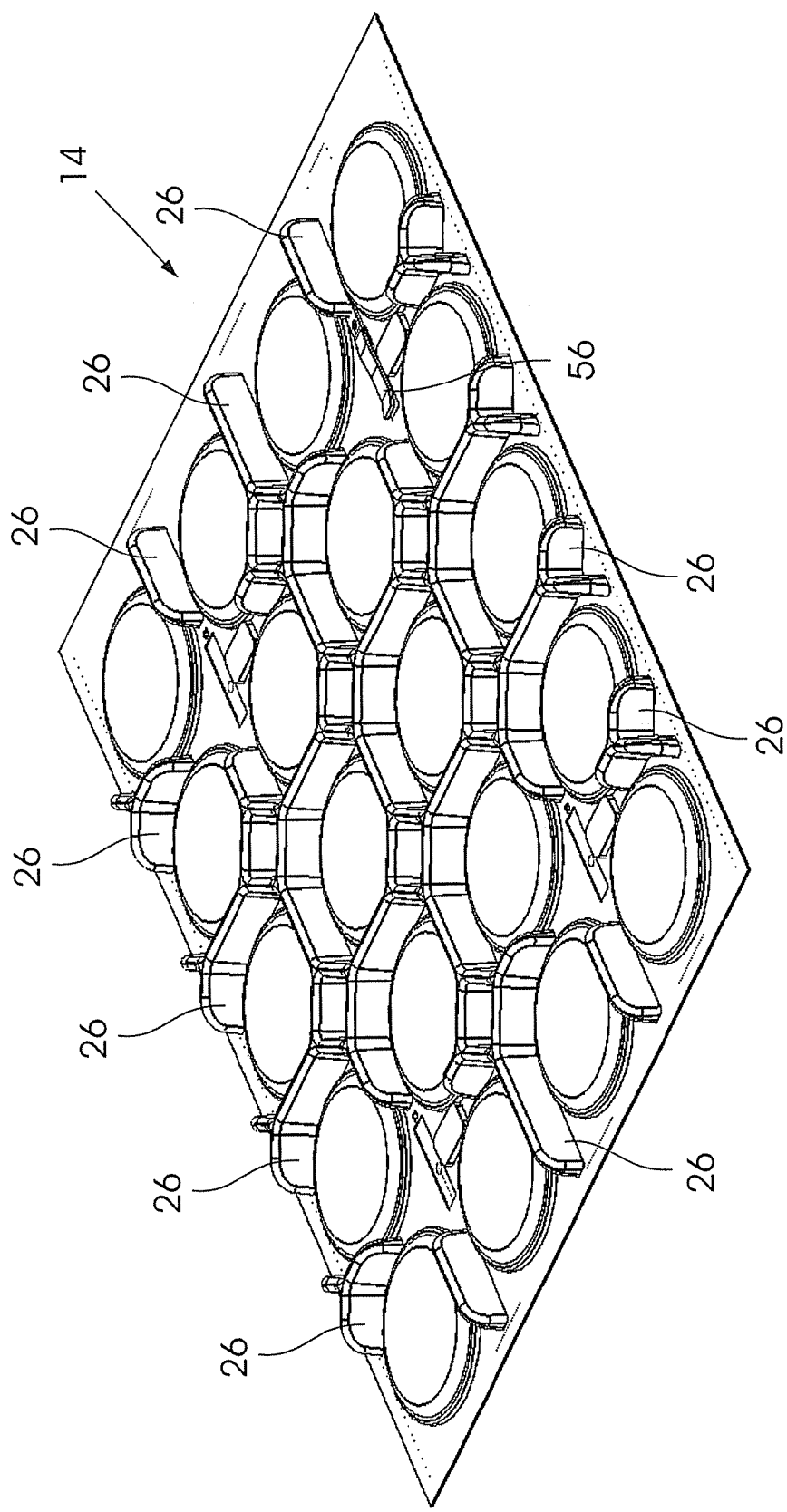
FIG. 4 shows a bottom perspective view of the first mould of FIG. 3 displaying stiffening ribs that act as locators between the first and second moulds.
Figure 5:
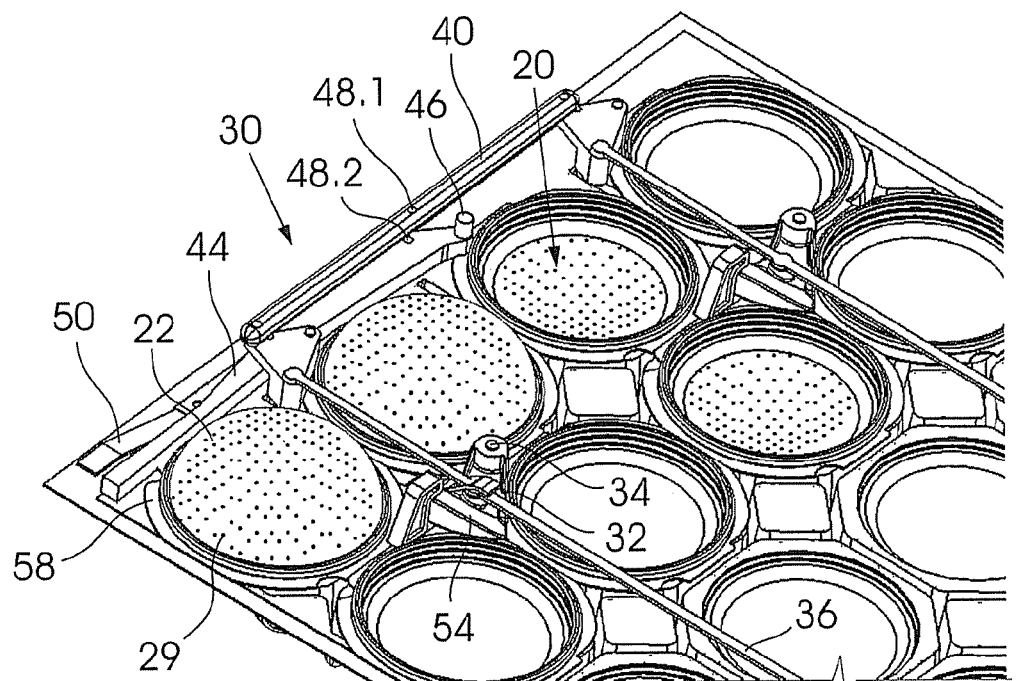
FIG. 5 shows a top perspective view of a second mould of the apparatus of FIG. 1.
Figure 6:
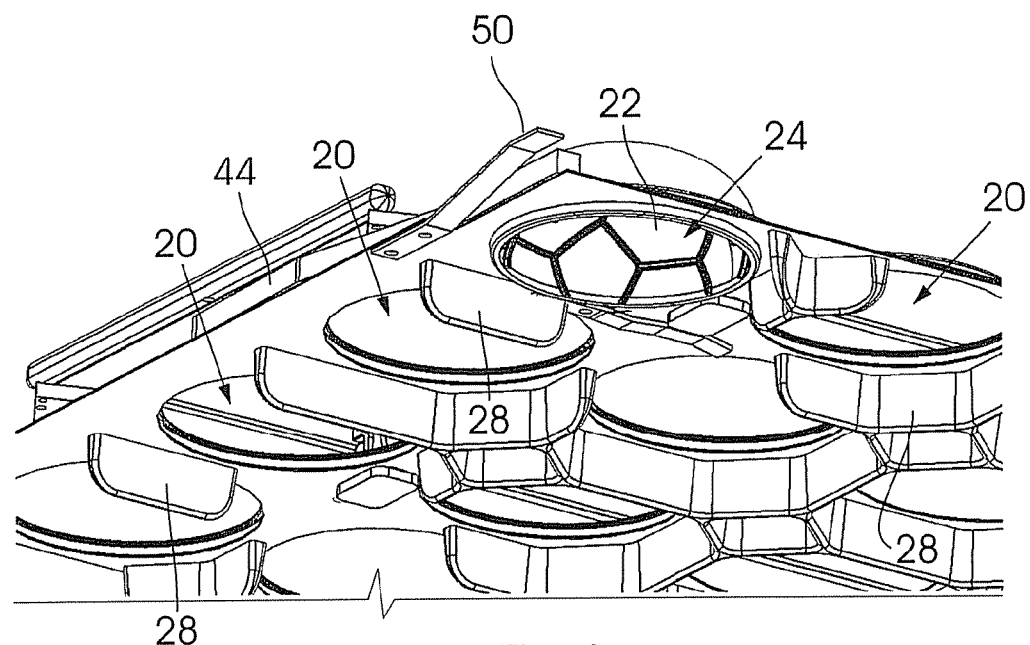
FIG. 6 shows a bottom perspective view of the second mould of FIG. 5 displaying stiffening ribs that act as locators between the first and second moulds.

The top mould 16 is locatable on the bottom mould 14 such that the dough receiving cavities in the bottom mould and the insert receiving openings in the top mould are aligned, thereby aligning the internal cavities of the inserts 20 with the dough receiving cavities in the bottom mould. To facilitate the alignment with respect of each other, the top and bottom moulds have complementally shaped locating formations which, in use, engage one another. Referring to FIGS. 3 and 4 of the accompanying drawings it can be seen that the locating formation on the bottom mould is in the form of hollow projections 26 projecting from a surface of the bottom mould which is, in use, a bottom surface. Referring now to FIGS. 5 and 6, the locating formation on the top mould is in the form of complementally shaped ridges 28 formed on a surface of the top mould which is, in use, a bottom surface. From the drawings it should be clear that the ridges 28 on the top mould is received in grooves defined by the hollow projections 26 on the bottom mould in order to locate the moulds relative to each other as well as stiffen and strengthen the trays. The cross-sectional view of FIG. 10 also shows one of the ridges of the top mould 16 being located in a groove of the bottom mould 14.

The top and bottom moulds both include ventilation holes 29 which allow air to escape during the baking process. The ventilation holes 29 in the top mould 16 are typically located in the insert 20 while ventilation holes in the bottom mould 14 are typically located in the dough receiving cavities 18.

The top and bottom moulds are securable to one another to prevent them from separating during the baking process as a result of the pressure exerted on them by the rising dough. In the illustrated embodiment the moulds are securable to one another by means of a securing mechanism 30 which is manually operable between a first, securing configuration wherein the moulds are secured together and a second, releasing configuration wherein the moulds are released from one another.

Figure 2:
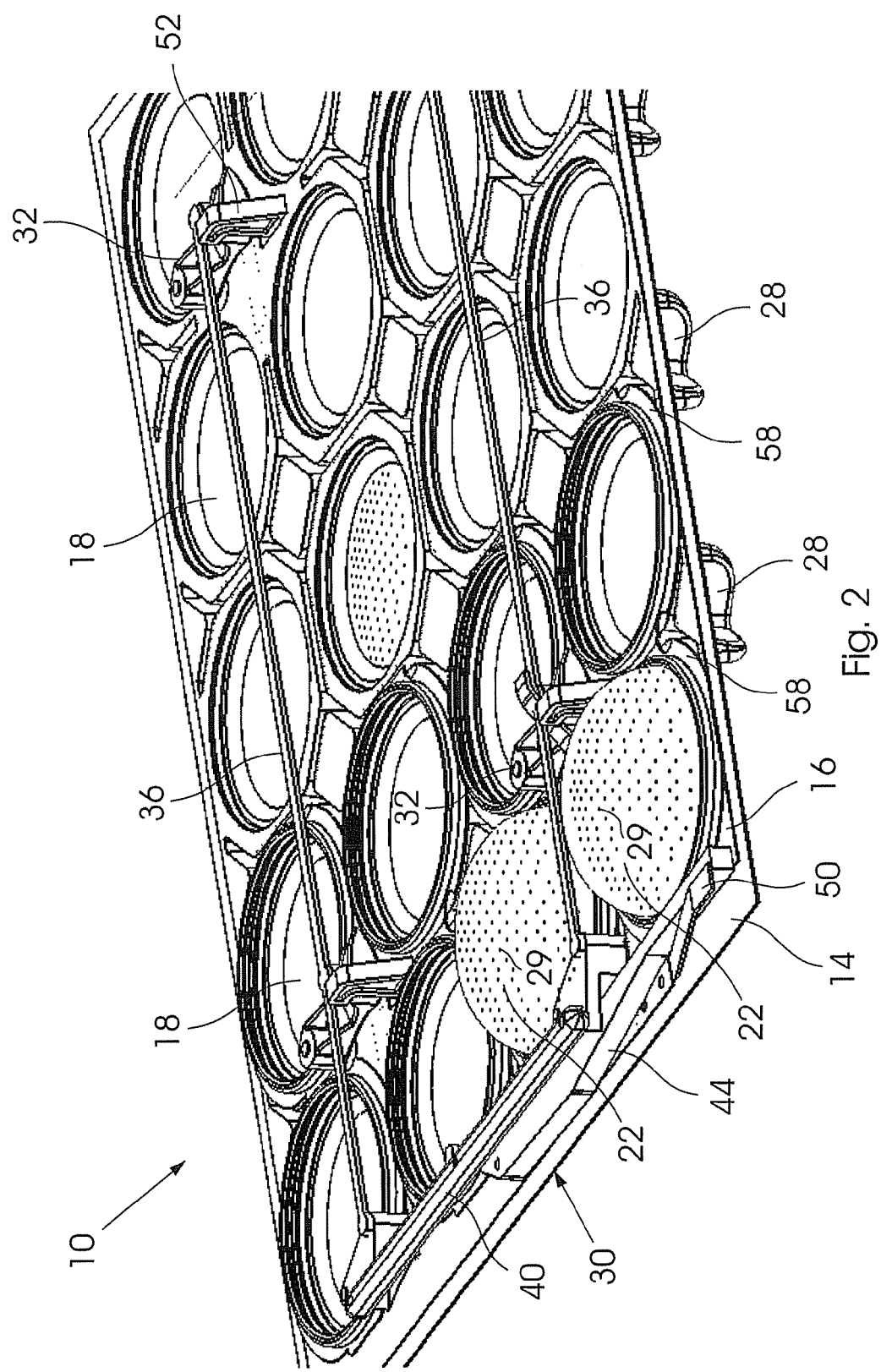
FIG. 2 shows a perspective view of the apparatus of FIG. 1 in which multiple inserts into which the rolls bake are visible.

The securing mechanism 30 is clearly visible in FIGS. 1 and 2, and from these figures it can be seen that the securing mechanism 30 includes a number of cams 32 which are rotatable about stubs 34 projecting from a surface of the top mould 16 which is, in use, a top surface. In the illustrated embodiment there are two pairs of cams 32, with the cams of each pair being connected to each other by means of connecting rods 36 to ensure synchronised movement of the cams when the securing mechanism 30 is manipulated between its securing and releasing configurations. To ensure that the movement of all four cams are synchronised, the ends of the connecting rods 36 are connected to one another by means of two connecting members 38.1 and 38.2 and another connecting rod 40 extending between the two connecting members. The connecting members 38.1 and 38.1 are also pivotal about stubs 42 projecting from the top surface of the top mould 14.

The securing mechanism 30 is moved between its securing and releasing configurations by means of a pivotal latch 44 which can be manually or automatically manipulated between an open position and a closed position corresponding to the releasing and securing configurations of the securing mechanism 30 respectively. The latch 44 is shown in its open position in FIG. 11 and in its closed position in FIG. 12. In these figures it can be seen that one end of the latch is pivotally connected to a stub 46 projecting from the top surface of the top mould 16, while the other end is shaped to be gripped by an operator.

Figure 11:
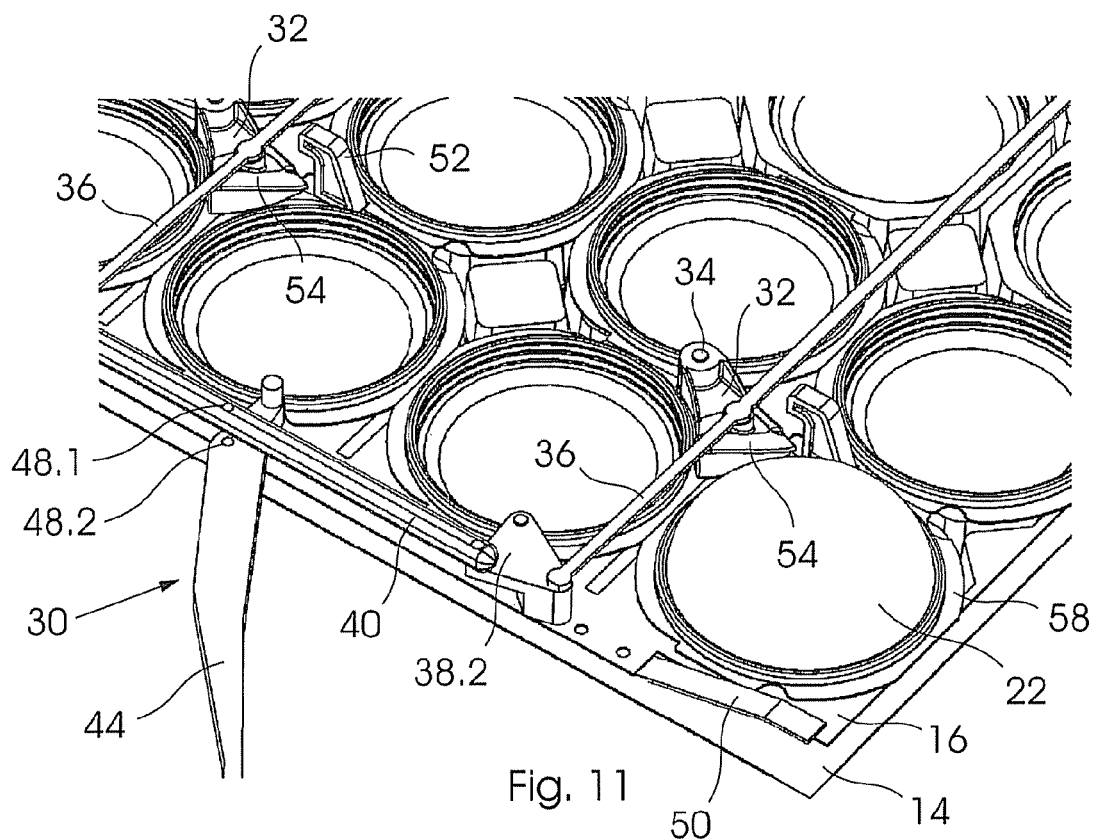
FIG. 11 shows a perspective view of the apparatus of FIG. 1 including a manually operable latch shown in its open position.
Figure 12:
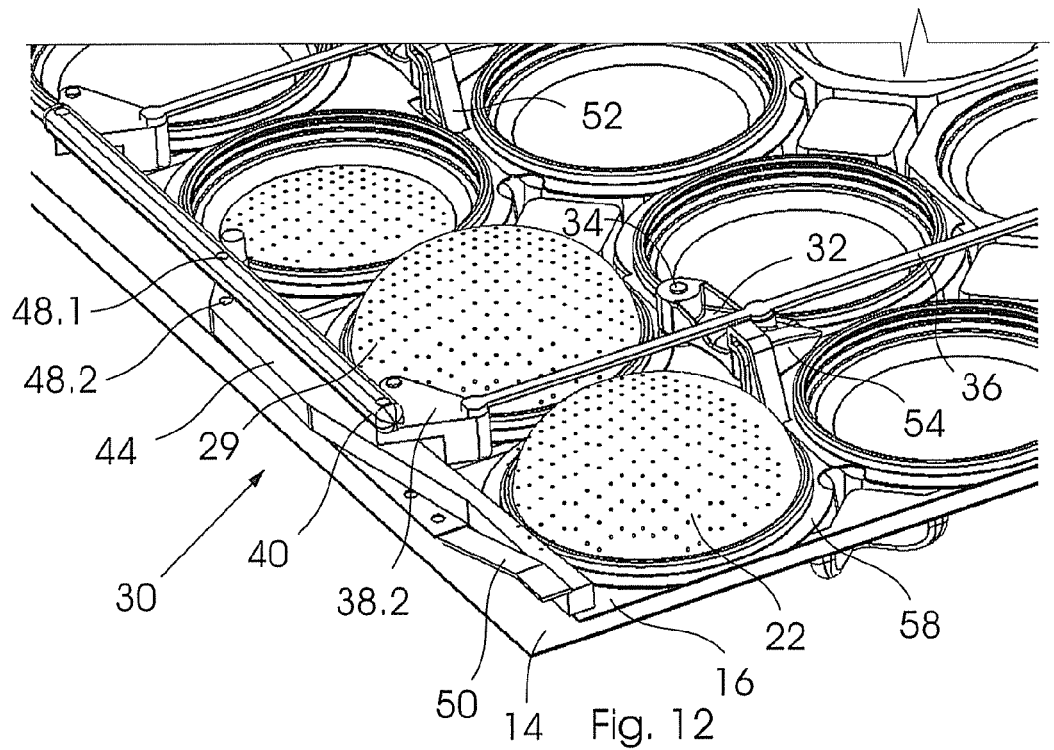
FIG. 12 shows a perspective view of the apparatus of FIG. 1 wherein the latch is shown in its closed position.
Figure 13:
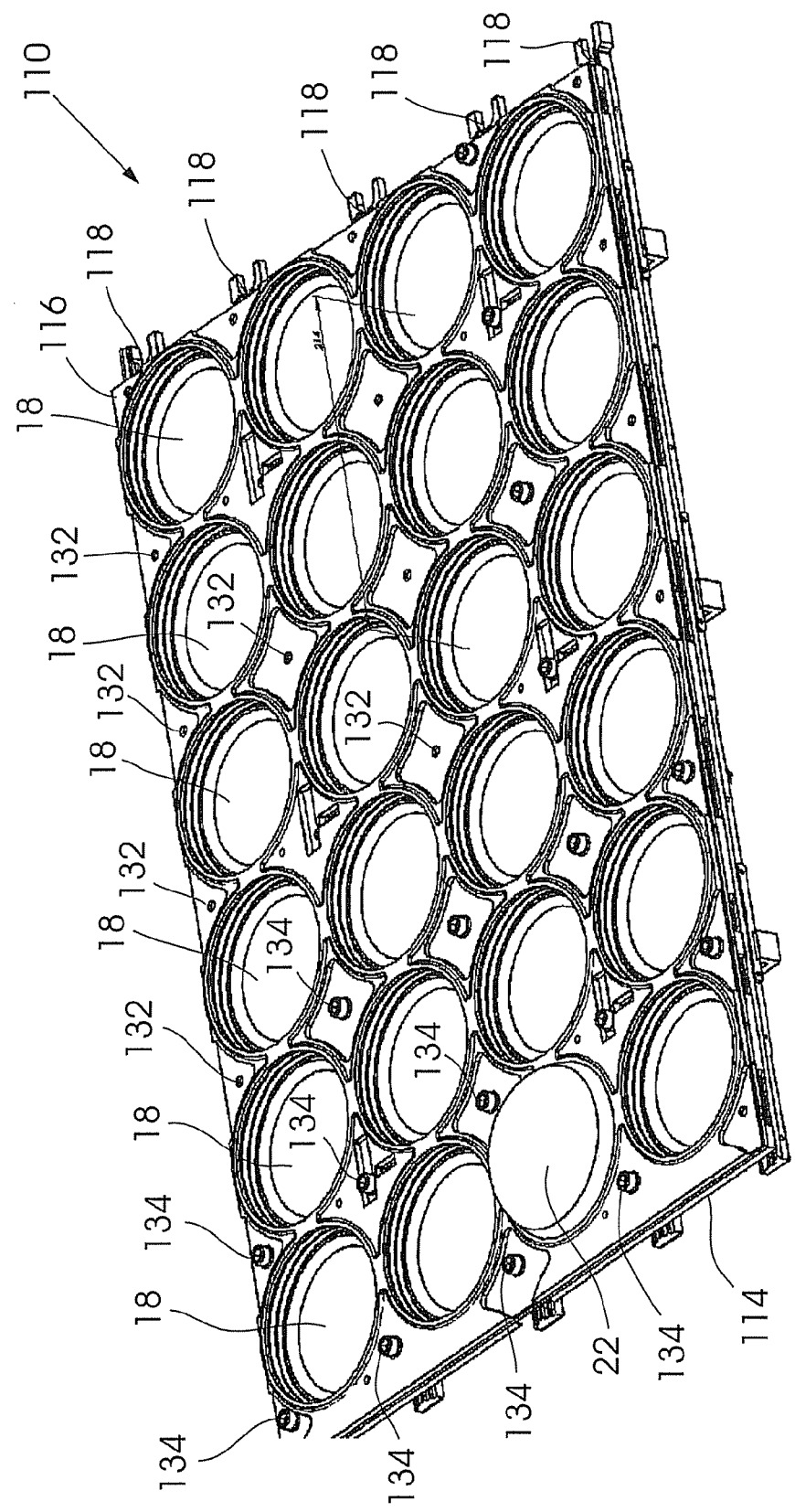
FIG. 13 shows a top perspective view of an apparatus for baking rolls according to a second embodiment of the invention.

Referring still to FIGS. 11 and 12, the connecting rod 40 and the latch 44 have corresponding holes indicated by the reference numerals 48.1 and 48.2 respectively for receiving a locating pin (not shown in the drawings) in them when aligned. The locating pin transfers movement of the latch 44 to the connecting rod 40 to ensure that manipulation of the latch between its open and closed positions is translated into movement of the securing mechanism 30 between its releasing and securing configurations.

The latch 44 is lockable in its closed position by means of a locking formation 50 in the form of a resilient tab, as shown in FIG. 2. In order to move the latch 44 from its closed position to its open position the tab 50 must be pressed down against its spring bias to allow the latch to pass over it.

From the above description it must be understood that when the latch 44 is moved from its open position to its closed position, the cams 32 rotate about their pivot stubs 34 from a position wherein the top mould 16 is allowed to be removed from the bottom mould 14 into a position wherein the top mould is prevented from being removed from the bottom mould. To prevent the top mould 16 from being removed from the bottom mould 14, each cam 32 has a corresponding, upstanding lock 52 which it engages when the locking mechanism 30 is in its securing configuration. It should be clear that the upstanding locks 52 are located on a surface of the bottom mould which is, in use, a top surface and extend though openings in the top mould.

The lock engaging surfaces 54 of the cams 32 are also shaped to allow easy locking of the cams i.e. when rotating them from their positions in which they allow the top mould to be removed from the bottom mould into their positions in which they prevent the top mould from being removed from the bottom mould. In the illustrated embodiment the lock engaging surfaces 54 are angled to allow for easy locking as set out above.

As mentioned above it is important to separate the top and bottom moulds quickly after the rolls have been removed from the oven to obtain a smooth surface finish on the rolls. For this reason, the apparatus 10 includes urging means 56 located between the two moulds which urge them apart. In the illustrated embodiment, the urging means 56 is in the form of leaf springs mounted on the bottom mould 14. In use, the springs 56 press against the top mould 16, thereby exerting a force on the top mould lifting it off the bottom mould. It should be clear that the springs 56 are arranged so as to lift the top mould off the bottom moulds automatically when the locking mechanism 30 is released, i.e. moved into its released configuration, thereby allowing the freshly baked rolls to breathe as the inserts 22 are lifted off them.

Figure 10:
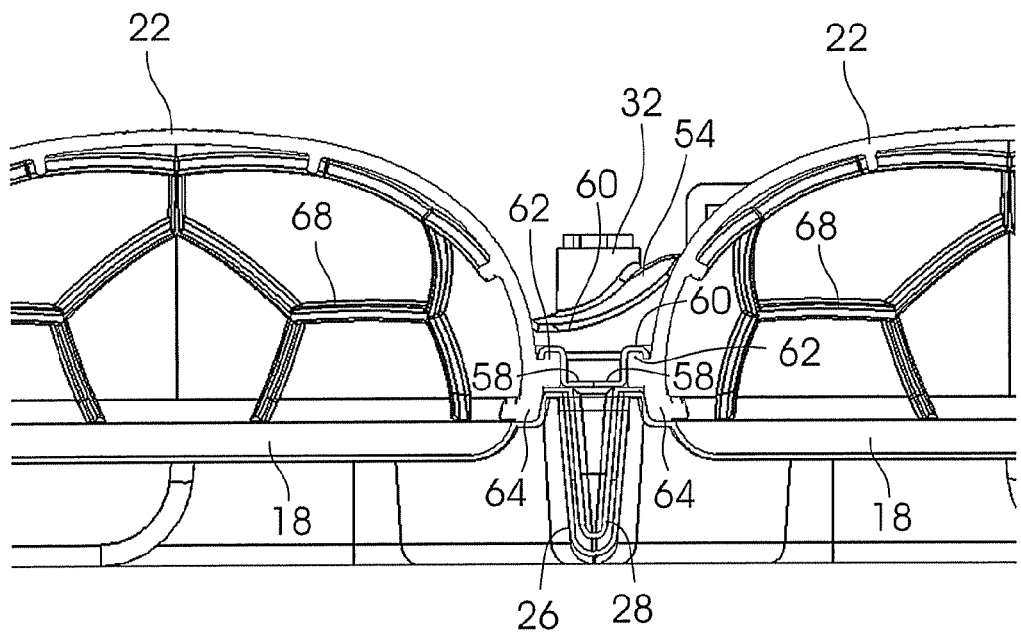
FIG. 10 shows a detailed cross-sectional side view of the apparatus of FIG. 1.

Returning now to the removable inserts 22, it should be understood that they are placed in the openings 24 in the top mould 16 prior to closing the securing mechanism 30 so that they are held captive by the top and bottom moulds when the securing mechanism is closed. In order to hold the inserts 22 captive, the top mould 16 has retaining rings 58 which, in use, engage the inserts to keep them from lifting off the top mould by the pressure of the rising dough. In FIG. 10 it can be seen that in the illustrated embodiment, each retaining ring 58 has a locking formation in the form of a lip 60 which engages a corresponding locking formation in the form of an annular rim 62 on the matching insert 22.

Referring still to FIG. 10, each insert 22 has a skirt 64 which, in use, locates in an annular recess 66 formed in the matching dough receiving cavity 18 in the bottom mould 14. The skirt 64 and recess 66 allow the inserts 22 to be easily aligned on the bottom mould 14 so that the dough receiving cavities 18 are aligned with the internal cavities of the inserts, into which the dough bakes during the baking process. The alignment of the inserts 22 on the bottom mould 14 also ensures that all of the rolls produced by the apparatus 10 have a uniform shape.

Another advantage of the skirt 64 extending into the recess 66 in the bottom mould 14 is that the insert 22, and therefore an ornamental design on the surface defining the internal cavity, extends towards the base of the rolls. In other words, the skirt 64 extends beyond the centre of the roll so that the decorative surface finish is also applied to at least a portion of the lower half of the roll. The skirt also makes it possible to extend the decorative design into the bottom mould so as to keep the bottom mould standard to accommodate numerous top mould designs.

In the preferred embodiment of the apparatus 10, the insert 22 is manufactured from a resilient or flexible material such as silicone, for example. However, in an alternative embodiment the insert could be manufactured from any other solid material capable of maintaining its shape during the entire baking process. The advantage of a material such as silicone is that it allows the inserts 22 to be injection moulded easily like other plastic materials while offering excellent wear and damage resistance. It is envisaged that this may be of particular importance in a commercial baking environment. The silicone inserts 22 are also easily replaceable as it is not necessary to replace the entire top mould 16 in the event of an individual insert 22 getting damaged.

The interchangeability of the inserts 22 also allows inserts of different designs to be used in the apparatus 10, thereby enabling the decorative surface finish of the rolls to be changed by changing the inserts only. The insert 22 is shown in cross-section in FIG. 7 so that its internal surface defining the internal cavity is visible. From this figure it can be seen that an ornamental design 68 is applied to the inside surface of the insert 22 defining the internal cavity. A person familiar with the art of baking decorative bread rolls will know that the decorative design 68 will result in a mirror image thereof being formed on the roll during the baking process. In this embodiment, the ornamental design is in the form of ridges which are shaped to resemble the appearance of a soccer ball.

Figure 7:
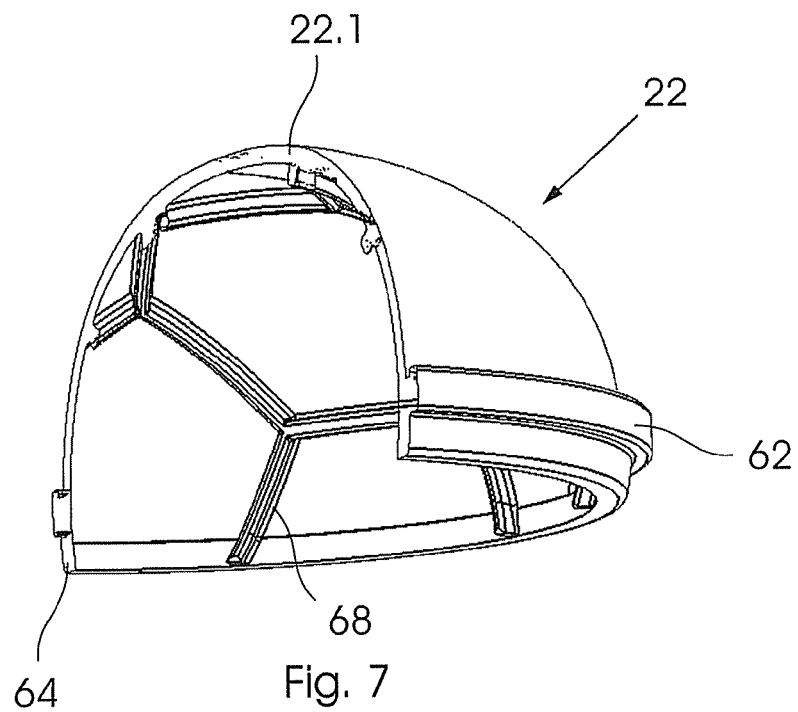
FIG. 7 shows a first embodiment of a removable insert of the apparatus of FIG. 1.
Figure 8:
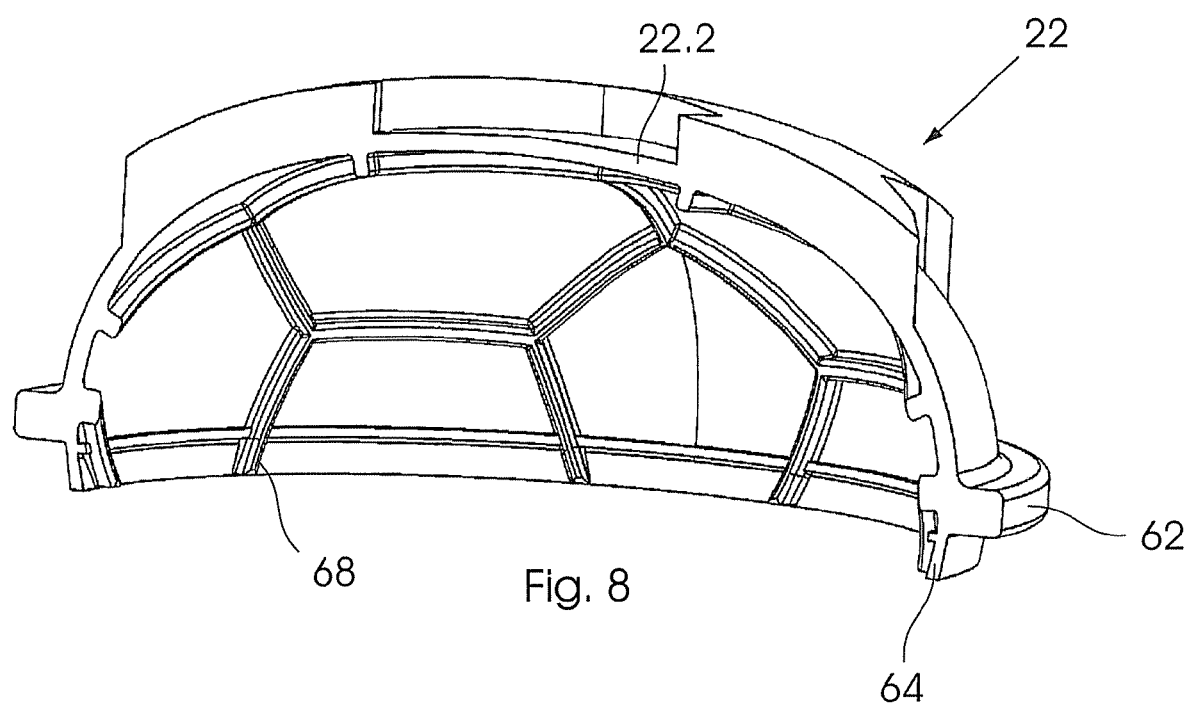
FIG. 8 shows a second embodiment of a removable insert of the apparatus of FIG. 1 having a sidewall of variable thickness.
Figure 9:
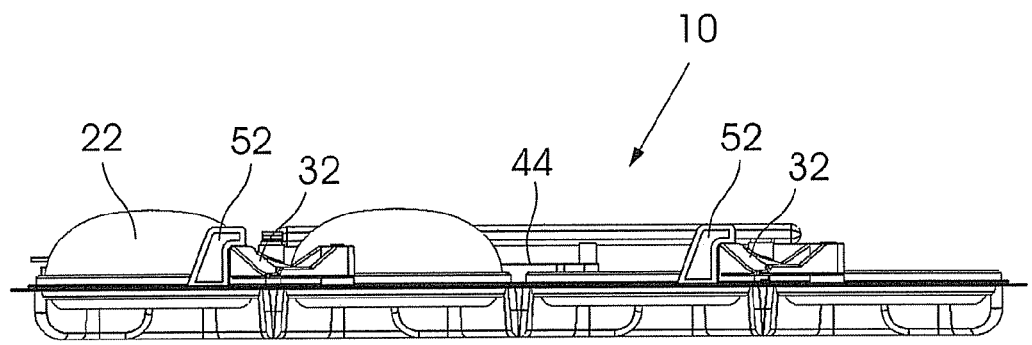
FIG. 9 shows a side view of the apparatus of FIG. 1 with the first and second moulds being secured to one another.

It can further be seen from FIG. 7 that, apart from the ridges 68, the sidewall 22.1 of the insert is of uniform thickness to ensure uniform browning of the outside surface of the roll. In contrast, FIG. 8 shows another embodiment of the insert in which its sidewall 22.2 is of variable thickness. As a result of the excellent heat resistivity of silicone, the browning of the outside surface of the roll can be controlled by controlling the thickness of the sidewall 22.2. For example, in the regions where the sidewall is thinner the browning on the roll will be increased while it will be decreased in the regions where the sidewall is thicker.

It must be understood that the decorative finish applied to the outside surface of the roll could take any shape or form that can be created by an ornamental design on the inside surface of the insert and/or by varying the thickness of the sidewall of the insert.

Although method of baking bread rolls having a decorative surface finish on their outside surfaces according to the invention should be clear from the above description it will now be set out briefly. The dough is placed in the dough receiving cavities 18 in the bottom mould 14 of the baking tray 12 and an inserts 22 is placed in each of the insert receiving openings 20 in the top mould 14. The top and bottom moulds are then brought together to locate them relative to each other such that the dough receiving cavities 18 on the bottom mould 14 are aligned with the internal cavities of the flexible inserts 22. The top and bottom moulds are then secured to one another by means of the securing mechanism 30 to prevent them from separating during the baking process. Once the moulds have been secured together the baking tray 12 is inserted into an oven and baked at a desired temperature for a desired amount of time.

The moulds are then separated from one another by releasing the securing mechanism 30 when the baking tray 12 is removed from the oven following the step of baking the dough. In the illustrated embodiment the moulds are automatically separated from one another by means of the leaf springs 56 urging them apart, thereby ensuring that all of the rolls are allowed to breathe simultaneously upon releasing the securing means.

A second embodiment of the apparatus for baking rolls in accordance with the invention will now be described with reference to FIGS. 13 to 17 in which the apparatus is indicated by the numeral 110. The apparatus 110 again includes a baking tray 112 which has a first mould 114 which is, in use, a bottom mould and a second mould 116 which is, in use, a top mould.

Figure 14:
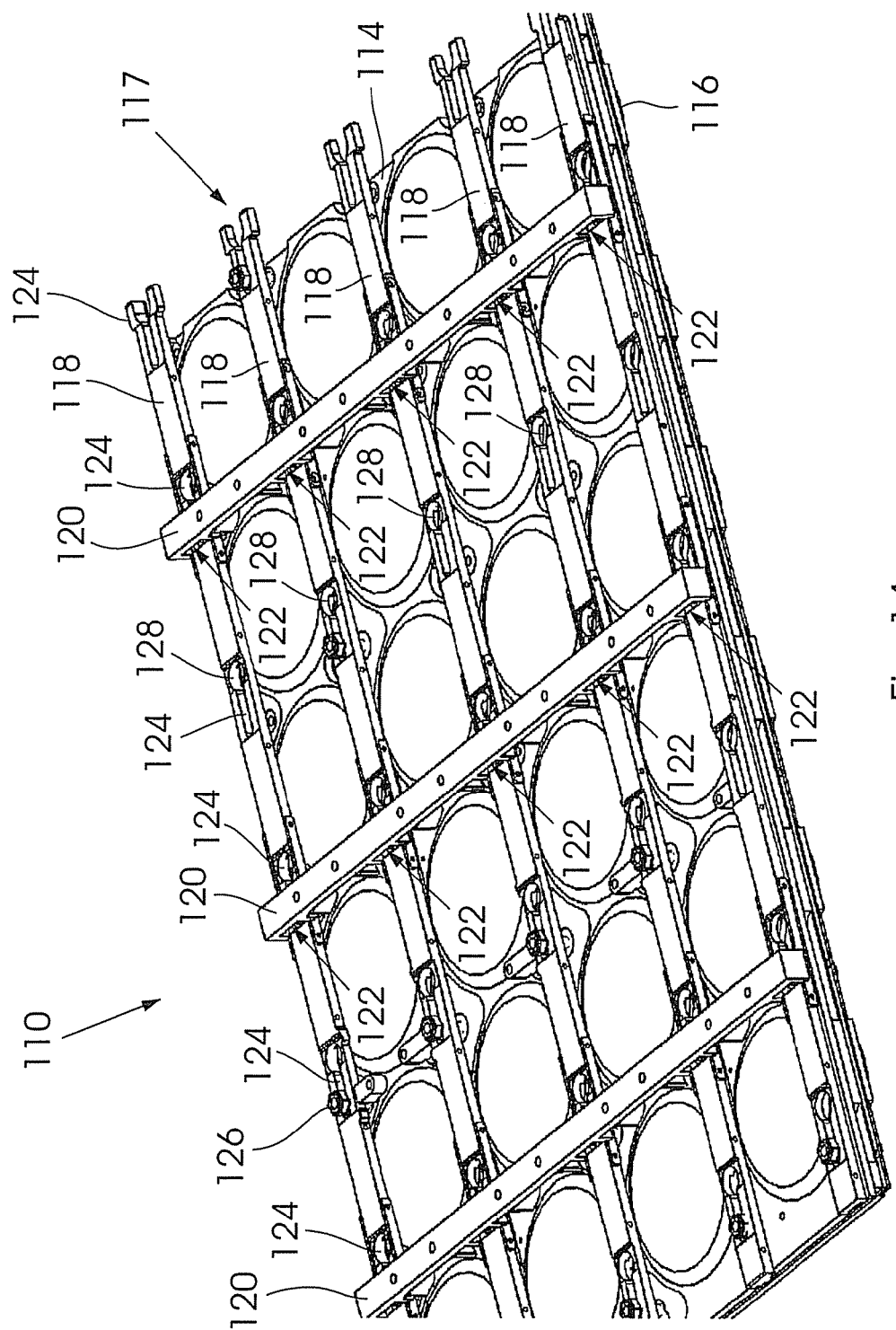
FIG. 14 shows a bottom perspective view of the apparatus of FIG. 13.

Although the method of baking using the apparatus 110 is substantially the same as that when using the baking tray 12, the method of securing the top mould 116 to the bottom mould 114 is different to that of the first embodiment. In the FIGS. 13 to 17, which show the second embodiment of the apparatus 110, the securing mechanism is indicated by the numeral 117. Referring in particular to FIG. 14 can be seen that the securing mechanism 117 includes five sliding bars or rods 118. The rods 118 run substantially parallel to one another along the longitudinal length of the bottom mould 114 and are secured thereto by means of transverse securing members 120. From FIG. 14 can be seen that the transverse securing members 120 are connected to the underside of the bottom mould 114 and define channels 122 to which the rods 18 are, in use, located. It must be clear that the channels 122 in the three securing members 120 align with one another so as to allow the sliding rods 118 to move back and forth in the aligned channels.

In must be understood that the securing mechanism is not limited to the two examples described above and illustrated in the accompanying drawings. Alternative latching and locking mechanisms are possible including the possibility of using magnets or other mechanical options.

Still referring to FIG. 14, each sliding rod 118 has a number of connecting formations 124 which are, in use, engageable with complementary shaped connecting formations 126 carried by the top mould 116. Although any number of connecting formations 124 could be used it has been found that the top and bottom moulds are effectively secured to one another when each sliding rod 118 has seven connecting formations 124 which each engage a corresponding connecting formation 126.

Figure 15:
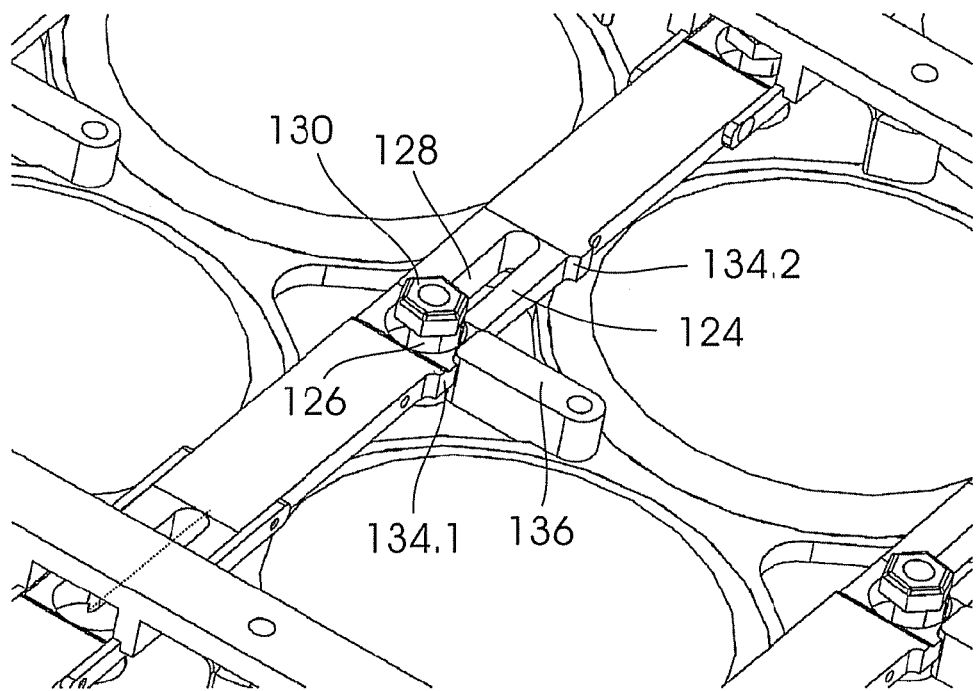
FIG. 15 shows an enlarged view of a securing mechanism of the apparatus of FIG. 13, with the securing mechanism being in an open configuration.
Figure 16:
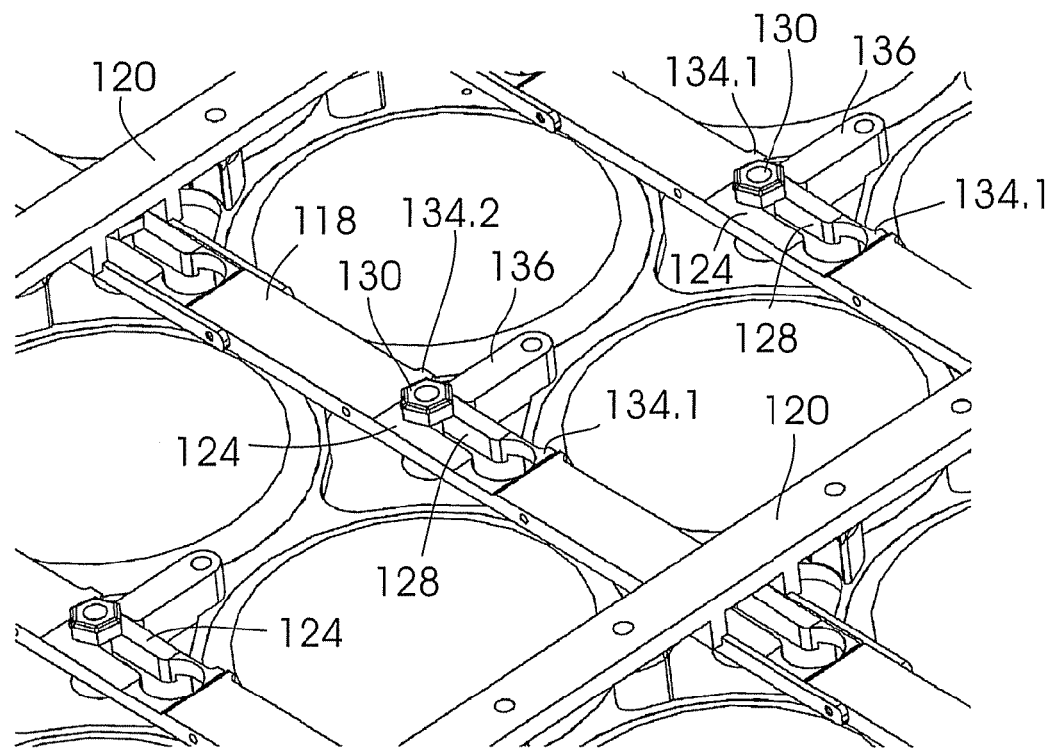
FIG. 16 shows an enlarged view of a securing mechanism of the apparatus of FIG. 13, with the securing mechanism being in a closed configuration.

In the embodiment illustrated in FIGS. 13 to 17 the connecting formations 124 of the sliding rod 118 are in the form of wedge connectors spaced apart along the longitudinal length of each rod. Each wedge connector has a key-shaped hole 128 extending through it. The connecting formations 126 of the top mould 116 are, in turn, in the form of pins which each carries an enlarged head 130. In use, the pins 126 extend from the top mould 116 and through the corresponding key shaped holes 128. The sliding rods 118 are movable between a first, releasing configuration wherein the top mould 116 may be removed from the bottom mould 114 and a second, securing configuration wherein the top mould is releasing to the bottom mould. FIGS. 15 and 16 show enlarged views of the sliding rods 118 in their releasing and securing configurations respectively. From FIG. 15 can be seen that the heads 130 of the pins 126 align with the larger ends of the corresponding key shaped holes 128 when the sliding rods are in their releasing configurations so that the top mould 114 may be removed from the bottom mould 112. In contrast, the pins 126 are received in the narrow ends of the corresponding key shaped holes 128 when the sliding rods 118 are in their securing configurations. It must be understood that in this securing configuration the heads 130 hold the wedges and, therefore, the sliding rods 118 captive.

It is envisaged that the sliding rods 118 could either be moved between their securing and releasing configurations manually by manipulating the rods independently or by manipulating them all simultaneously i.e. in harmony. Where all of the rods 118 are moved simultaneously, an interconnecting member (not shown in the accompanying drawings) may be used to connect all of the rods together so that they can move in harmony. It is also envisaged that the securing mechanism 117 may be automatically operable between its releasing and securing configurations.

In this second embodiment of the apparatus 110 the securing mechanism 116 includes at least one movement limiting means to limit the movement of the sliding rods 118. As shown in FIGS. 15 and 16 each sliding rod 118 has two shoulders 134.1 and 134.2 which interact with an associated stop 136 to limit its movement. It must be clear that the shoulder 134.1 limits the movement of the corresponding slide rod 118 in one direction while the shoulder 134.2 limits its movement in the opposite direction. In other words, the shoulders 134.1 and 134.2 define a range of motion of the sliding rods 118.

Returning to FIG. 13 it can be seen that the pins 126 are secured in holes 132 in the top mould 116. The pins 126 are secured in the holes 132 by means of socket carrying formations 134 in which a tool can be inserted to tighten the pins to the top mould.

In comparing the securing mechanism 116 of the second embodiment with that of the first embodiment it can be seen that that instead of only six securing locations the mechanism 116 has thirty five securing locations. It is believed that the increase in the number of securing locations could lead to improved sealing between the silicone inserts and the bottom mould 114.

The securing mechanism 116 also includes fewer movable components and, in particular, eliminates the use of rotating or pivoting components in order to reduce the amount of maintenance required in keeping the baking tray 112 in working condition. From the accompanying drawings it can be seen that all of the movable components of the backing tray 112 are located on the underside of the bottom mould 114, thereby minimising the risk of them being damaged in use. It has also been found that the underside of the baking tray 112 in general stays cleaner than the top side. Accordingly, by mounting the movable components on the underside of the tray 112 the risk of them jamming or sticking is reduced.

Referring now to FIG. 17, which shows a cross-sectional view through the baking tray 112, the connection between the silicone inserts and the bottom mould 114 of the second embodiment will now be described in more detail. The silicone inserts of the baking tray 112 are indicated by the numeral 138 in the accompanying drawings.

The skirt 64 of each silicone insert 138 carries a circumferential ridge 140 protruding from the end thereof which is in use its bottom end. The ridge 140 is received in a complementary shaped annular groove 142 located about the dough receiving cavity 18 in the bottom mould 114. The annular groove 142 creates a shoulder 144 which prevents the skirt 64 from moving inwards towards the roll during the baking process. The ridge 140 also increases the surface area of the silicone to improve sealing between the top and bottom moulds 114 and 116.

Although not shown in the accompanying drawings, top and bottom moulds of the apparatus 110 also include ventilation holes which allow air to escape during the baking process. The ventilation holes are substantially similar to those of the apparatus 10.

From the above description it should be clear that the apparatus 10, 100 has been designed for use with commercial baking techniques and systems including but not limited to conveyer belt ovens, rack ovens and trolley ovens.

The invention claimed is:

1. An apparatus for baking products, comprising:
a baking tray which has a first mould and a second mould which are securable to one another to prevent them from separating during the baking process;
wherein the second mould has an internal cavity defined by an insert made from a flexible material, the internal cavity being aligned with a dough receiving cavity in the first mould when the first and second moulds are secured together, the internal cavity in the insert being shaped so that the baked product bakes into it during the baking process;
wherein the insert has breathing holes for allowing trapped air to escape as the dough rises into the internal cavity during the baking process, and wherein the insert carries an ornamental design to create a decorative surface finish on the product baked between the two moulds during the baking process.

2. The apparatus according to claim 1, wherein the ornamental design is carried by an internal surface of the insert defining the cavity into which the product bakes during the baking process.

3. The apparatus according to claim 1, wherein the insert is removable so that it is interchangeable with another insert carrying the same or an alternative decorative design, and wherein the insert is held captive by the first mould or by the first and second moulds combined when the moulds are secured together.

4. The apparatus according to claim 1, wherein the insert is a silicone insert.

5. The apparatus according to claim 1, wherein the sidewall of the insert is of variable thickness so as to create at least one area of higher thermal resistance and at least one area of lower thermal resistance so as to create thermal barriers in certain areas to achieve a controlled browning pattern.

6. The apparatus according to claim 1, wherein the insert includes a locating formation for locating it in a corresponding locating formation on the first mould, thereby locating the insert relative to the first mould when the locating formations are engaged, and wherein the locating foimation on the insert is in the form of an annular skirt while the locating formation on the first mould is in the form of an annular recess capable of receiving the skirt.

7. The apparatus according to claim 6, wherein the skirt carries a circumferential ridge protruding from the end thereof which is, in use, its bottom end while the fist mould carries a complementary shaped annular groove located about the dough receiving cavity in which the ridge is received when the skirt is located in the annular recess to prevent the skirt from moving inwards towards the roll during the baking process.

8. The apparatus according to claim 1, wherein the second mould has a number of insert receiving openings and the first mould has a corresponding number of dough receiving cavities such that a single baking tray can be used to bake a number of individual products.

9. The apparatus according to claim 1, wherein the first and second moulds have complementary shaped locating formations which engage one another to align the insert receiving openings in the second mould with the dough receiving cavities in the first mould when the moulds are secured together.

10. The apparatus according to claim 1, wherein the first and second moulds are securable to one another by means of a securing mechanism which is manually or automatically operable between a first, securing configuration wherein the moulds are secured together and a second, releasing configuration wherein the moulds are released from one another.

11. The apparatus according to claim 10, further comprising urging means located between the first and second moulds for urging the moulds apart from one another, thereby allowing the first and second moulds to be separated automatically when the securing mechanism is in its releasing configuration.

12. A method of baking products having a decorative surface finish on their outside surfaces, the method comprising the following steps:
  placing dough in a dough receiving cavity in a first mould of a baking tray;
  providing a second mould having an internal cavity defined by an insert made from a flexible material;
  locating the second mould on the first mould such that the dough receiving cavity on the first mould is aligned with the internal cavity of the insert;
  securing the second mould to the first mould by means of a securing mechanism to prevent them from separating during the baking process;
  inserting the baking tray into an oven;
  baking the dough at a desired temperature for a desired amount of time such that the baked product bakes into the internal cavity of the insert; and
  applying a decorative surface finish to the baked product by means of an ornamental design carried by the insert.

13. The method according to claim 12, further comprising the step of separating the moulds from one another by releasing the securing mechanism when the baking tray has been removed from the oven following the step of baking the dough.

14. The method according to claim 13, further comprising the step of urging the first and second trays apart using urging means such that the moulds are automatically separated upon release of the securing mechanism.

15. The method according to claim 12, further comprising the step of varying the thickness of the insert so as to create thermal barriers in certain areas to achieve a controlled browning pattern.

16. The method according to claim 12, further comprising the step of providing the ornamental design on an internal surface of the insert defining the cavity into which the product bakes thereby to impart the ornamental design on the baked product.

17. The apparatus according to claim 1, wherein the insert is removable.

* * * * *

UNITED STATES PATENT AND TRADEMARK OFFICE
CERTIFICATE OF CORRECTION

| | | |
|---|---|---|
| PATENT NO. | : 9,565,860 B2 | Page 1 of 1 |
| APPLICATION NO. | : 14/438738 | |
| DATED | : February 14, 2017 | |
| INVENTOR(S) | : Andrew Stuart van Aswegen et al. | |

It is certified that error appears in the above-identified patent and that said Letters Patent is hereby corrected as shown below:

In the Claims

Column 11, Line 13, Claim 6, delete "foimation" and insert -- formation --

Column 11, Line 19, Claim 7, delete "fist" and insert -- first --

Signed and Sealed this
Twelfth Day of September, 2017

Joseph Matal
*Performing the Functions and Duties of the*
*Under Secretary of Commerce for Intellectual Property and*
*Director of the United States Patent and Trademark Office*